UNITED STATES PATENT OFFICE.

CORNELIUS ODEGARD, OF HELENA, MONTANA, ASSIGNOR TO CEREAL MINCE COMPANY, OF MINNEAPOLIS, MINNESOTA, A CORPORATION.

COMPOSITION OF MATTER TO BE USED AS A FOOD.

1,111,917.  Specification of Letters Patent.  Patented Sept. 29, 1914.

No Drawing.  Application filed March 9, 1914. Serial No. 823,560.

*To all whom it may concern:*

Be it known that I, CORNELIUS ODEGARD, a citizen of the United States, residing at Helena, in the county of Lewis and Clark and State of Montana, have invented certain new and useful Improvements in Compositions of Matter to be Used as a Food, of which the following is a specification.

My invention relates to a composition of matter to be used as a food, particularly a food having the purposes and of the class of such foods as are commonly known as breakfast foods, and to the method of preparing the same.

Most breakfast foods are composed of a more or less granular meal derived from some grain, such as oats, wheat, corn, etc.; and the food is prepared by boiling this meal so as to make a porridge or mush, which is then generally eaten with sugar and milk, or some similar ingredient, to render the food sufficiently appetizing and tasteful to be really eatable. It is well known that such breakfast food porridges, although healthful and nutritious to a high degree, are flat and unsatisfactory to the taste and hardly would be eaten at all except for the bribe of cream and sugar or similar ingredients which is eaten with the porridge. The food of my invention combines the best features of a breakfast food together with elements which render the porridge formed thereform not only of the highest nutritive value but fragrant and pleasant to the taste entirely independenet of other substances, such as cream and sugar.

My improved breakfast food consists of definite proportions of granular wheat meal and corn meal, or wheat meal, corn meal and rye meal in the natural dry uncooked condition, with a certain amount of chocolate or cocoa incorporated and combined therewith in accordance with the process of my invention. While I have obtained the best results with wheat meal and corn meal or wheat meal, corn meal and rye meal, combined with chocolate or cocoa, I do not want to restrict myself to this exact combination of meals, as the employment of chocolate or cocoa combined with any granular cereal meal by my improved process will give a food having highly desirable characteristics.

In the preparation of my food I preferably combine twenty-five parts by weight of the cereal meals and one part by weight of chocolate or cocoa. The meals should be quite free from flour or middlings and of a fairly large granular size, and are first sterilized by any of the well known methods. The chocolate or cocoa is finely pulverized and is thoroughly mixed dry with the dry meals. The mixture is then subjected to a heat of approximately two hundred degrees for a short period. This melts the chocolate granules adhering to the meal granules and causes the chocolate to permeate and completely adhere to the meal granules. After this the food is put in cartons, preferably sealed from the air, and is ready for the market.

Where wheat meal and corn meal are employed for the cereal meals, I preferably use twenty parts of wheat meal and five parts of corn meal, preferably white corn meal. Where I employ rye as a part of the mixture, I use sixteen parts by weight of wheat meal, four parts by weight of rye meal and five parts by weight of corn meal, all of which are of the well defined granular consistency above indicated. In each case I employ twenty-five parts by weight of the cereal meal with one part by weight of chocolate or cocoa, although this proportion may be varied as desired to make the resulting compound more or less in chocolate. I have found, however, that, when combined according to my process, the proportions of twenty-five parts of meal to one of chocolate, all dry weight, gives highly satisfactory results. The mere mixing of the chocolate with the grains is not sufficient to produce the results of my invention, as the chocolate powder in the granular mixture of meals will gravitate through the same and collect at the bottom of the packages. Furthermore, the incorporating of the chocolate in the melted form in the grains of meal thus assists in preparing the meal and renders it more palatable after cooking.

I claim:

1. A composition of matter for use as a breakfast food comprising a plurality of different granular cereal meals and chocolate or cocoa incorporated and combined substantially as described, so that the chocolate permeates and is incorporated with the uncooked grains of the meals.

2. A composition of matter for use as a breakfast food comprising twenty-five parts by weight of granular cereal meals and one part by weight of chocolate or cocoa, all in the dry form, comingled and combined substantially as described.

3. The process of making a composition of matter to be used as a breakfast food, which consists in thoroughly comingling granular cereal meals in the natural dry uncooked condition in fixed proportions with powdered chocolate or cocoa and thereafter subjecting the mixture for a short period to a heat approximately two hundred degrees Fahrenheit to melt the chocolate and cause the same to permeate and be incorporated with the grains of the meals.

In testimony whereof I affix my signature in presence of two witnesses.

CORNELIUS ODEGARD.

Witnesses:
R. A. WEISNER,
W. D. TIPTON.